(12) United States Patent
Avidar et al.

(10) Patent No.: US 11,113,657 B2
(45) Date of Patent: Sep. 7, 2021

(54) METHOD AND SYSTEM FOR PHYSICAL ASSET TRACKING

(71) Applicant: Lob.com, Inc., San Francisco, CA (US)

(72) Inventors: Leore Avidar, San Francisco, CA (US); Ami Wang, San Francisco, CA (US); Manushika Yapa, San Francisco, CA (US)

(73) Assignee: Lob.com, Inc., San Francisco, CA (US)

( * ) Notice: Subject to any disclaimer, the term of this patent is extended or adjusted under 35 U.S.C. 154(b) by 0 days.

(21) Appl. No.: 17/127,244

(22) Filed: Dec. 18, 2020

(65) Prior Publication Data
US 2021/0192442 A1    Jun. 24, 2021

Related U.S. Application Data

(60) Provisional application No. 62/950,388, filed on Dec. 19, 2019.

(51) Int. Cl.
| | |
|---|---|
| *G06Q 30/00* | (2012.01) |
| *G06Q 10/08* | (2012.01) |
| *G06K 7/14* | (2006.01) |
| *G06F 3/12* | (2006.01) |
| *G06Q 30/04* | (2012.01) |
| *G06K 19/06* | (2006.01) |

(52) U.S. Cl.
CPC ........... *G06Q 10/0833* (2013.01); *G06F 3/12* (2013.01); *G06K 7/1413* (2013.01); *G06K 19/06028* (2013.01); *G06Q 30/04* (2013.01)

(58) Field of Classification Search
CPC ..... G06Q 10/0833; G06F 3/12; G06K 7/1413

USPC ......................................................... 705/333
See application file for complete search history.

(56) References Cited

U.S. PATENT DOCUMENTS

| | | | |
|---|---|---|---|
| 7,778,939 B2 | 8/2010 | Ogg et al. | |
| 9,977,633 B1 | 5/2018 | Khafizova | |
| 2003/0218770 A1 | 11/2003 | Field | |
| 2004/0207867 A1 | 10/2004 | Stringham | |
| 2011/0029429 A1* | 2/2011 | Whitehouse ..... | G07B 17/00435 |
| | | | 705/39 |
| 2012/0084222 A1* | 4/2012 | Zimberoff .............. | G06Q 10/08 |
| | | | 705/330 |
| 2013/0054491 A1 | 2/2013 | Chatow et al. | |
| 2014/0079428 A1 | 3/2014 | Park et al. | |
| 2014/0149308 A1* | 5/2014 | Ming ................. | G06Q 10/0833 |
| | | | 705/333 |

(Continued)

FOREIGN PATENT DOCUMENTS

JP    2013206235 A    10/2013

OTHER PUBLICATIONS

Chen, Anthony "How We Solve Problems at Lob—Intelligent Mail Through Routing" Lob Blog,https://www.lob.com/blog/how-we-solve-problems-at-lob-intelligent-mail-through-routing, Nov. 9, 2020, 15 pages.

(Continued)

*Primary Examiner* — Ahshik Kim
(74) *Attorney, Agent, or Firm* — Jeffrey Schox; Diana Lin

(57) ABSTRACT

A method for tracking physical assets can include: receiving a digital asset; determining an asset identifier for the digital asset; generating an asset barcode; optionally facilitating printing and sending of the asset to an asset recipient; determining an asset event for the asset; and notifying a sender of an asset event.

20 Claims, 5 Drawing Sheets

(56) References Cited

U.S. PATENT DOCUMENTS

2016/0300250 A1   10/2016  Rai et al.
2016/0352976 A1   12/2016  Kuroiwa
2018/0240066 A1*   8/2018  Streebin ............. G06Q 10/0833
2019/0311325 A1*  10/2019  Reblin ................. G06K 7/1413
2020/0234229 A1*   7/2020  Bolha .................. G06K 7/1413

OTHER PUBLICATIONS https://help.postal.io/en/articles/3727502-reporting-metrics.
https://sendoso.zendesk.com/hc/en-us/articles/360045052631-Send-Tracker-FAQ-.
Smart Order Routing, "How Do We Route Print Jobs?", https://www.cloudprinter.com/order-routing, Nov. 9, 2020, 9 pages.

* cited by examiner

METHOD AND SYSTEM FOR PHYSICAL ASSET TRACKING

CROSS-REFERENCE TO RELATED APPLICATIONS

This application claims the benefit of U.S. Provisional Application No. 62/950,388 filed 19 Dec. 2019, which is incorporated in its entirety by this reference.

TECHNICAL FIELD

This invention relates generally to the delivery services field, and more specifically to a new and useful method for physical asset tracking.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
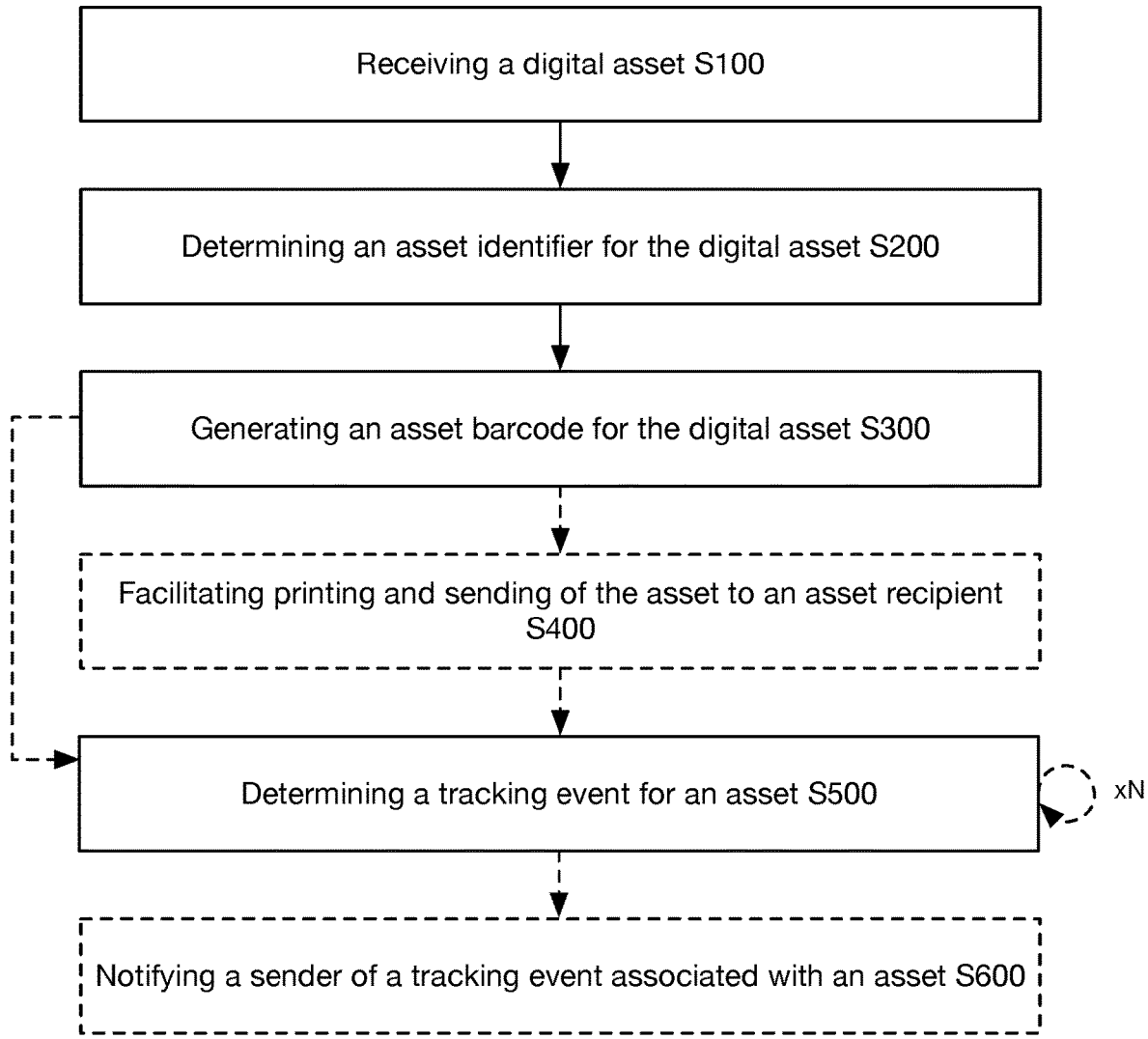
FIG. 1 is a schematic representation of the method.

As shown in FIG. 1, the method for tracking physical assets preferably includes receiving a digital asset S100, determining an asset identifier for the digital asset S200, generating an asset barcode S300, determining an asset event for the physical asset S500, and notifying a sender of an asset event S600, but the method can additionally or alternatively include facilitating printing and sending of the physical asset to an asset recipient S400, and/or any other suitable elements. The method preferably functions to determine, track, and provide asset events for an asset, following the asset from physical creation (e.g., printing) to recipient delivery. In variants, one or more digital physical assets included in an order can be tracked in aggregate.

Figure 2:
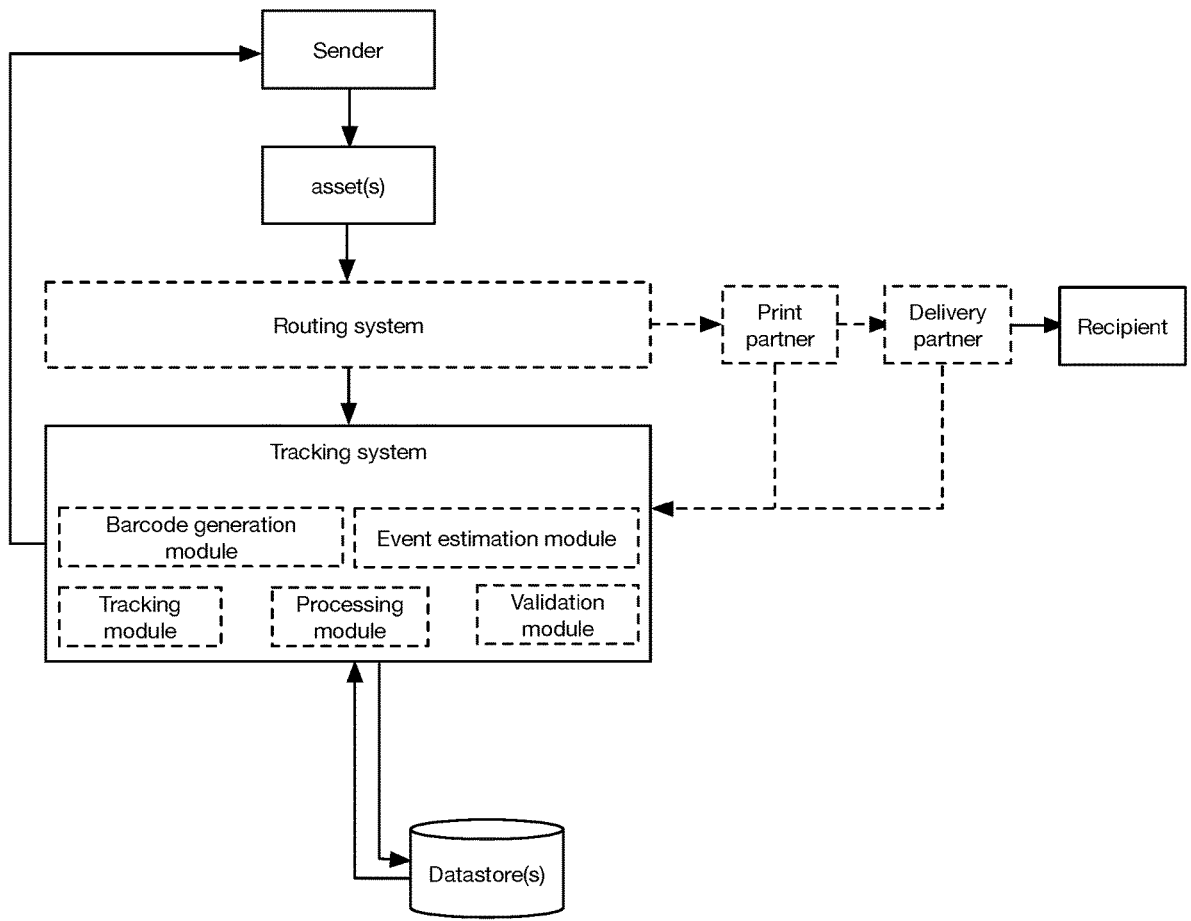
FIG. 2 is a schematic representation of the system.

The system 20 for tracking physical assets can include one or more tracking systems and one or more datastores, but can additionally or alternatively include any other suitable elements. The tracking system can include a barcode generation module, a tracking module, and a processing module, but can additionally or alternatively include any other suitable modules. Variants of the system are depicted in FIG. 2.

The asset events are preferably provided to a sender endpoint (e.g., via an API), such as the asset originator sending the asset or an asset event subscriber, wherein the sender endpoint can initiate downstream actions (e.g., communications, discounts, etc.) based on the respective asset event. For example, the sender endpoint can trigger out-of-band communication(s) to the intended recipient in response to receipt of the asset event. Examples of out-of-band communications that can be triggered include: phone calls, emails, advertisements, push notifications, and/or any other suitable communication, such as to reinforce an advertising campaign illustrated by the printed asset. In a first specific example, an advertisement can be shown to an intended recipient (e.g., on a social network, on a third-party application, etc.) in response to receipt of a "picked-up" asset event (e.g., mailed event) from the system. In a second specific example, an email can be sent to the intended recipient in response to receipt of a "delivered" asset event from the system. In a third specific example, recipient metrics, such as a recipient response time, can be determined based on the asset events (e.g., based on how quickly an mail insert's identifier is detected in the mail stream from the delivery partner(s)). However, the asset events generated by the system and method can be otherwise used.

2. Examples

In a first example, the method for asset tracking includes receiving a digital version of the asset associated with a sender; determining an asset identifier for the asset; generating an asset barcode based on the asset identifier; transmitting the digital version to a printer, wherein the printer prints the asset and the asset barcode; determining a picked-up event for the asset, wherein the picked-up event represents asset pick-up from the printer by a delivery service; and notifying the sender of the picked-up event.

In a second example, the system generates the asset barcode for the received digital asset. The system interfaces with both a print partner, to print the digital asset and the asset barcode, and a delivery service, to deliver the printed asset to the intended recipient (e.g., customer) based on a recipient address and the asset barcode. The print partner and the delivery service can be separate and distinct from the system. In this example, the unused bits of a conventional asset barcode are replaced by this system with predetermined bits that enable individualized asset tracking (e.g., asset identifier, sender identifier, system identifier, etc.).

Figure 3:
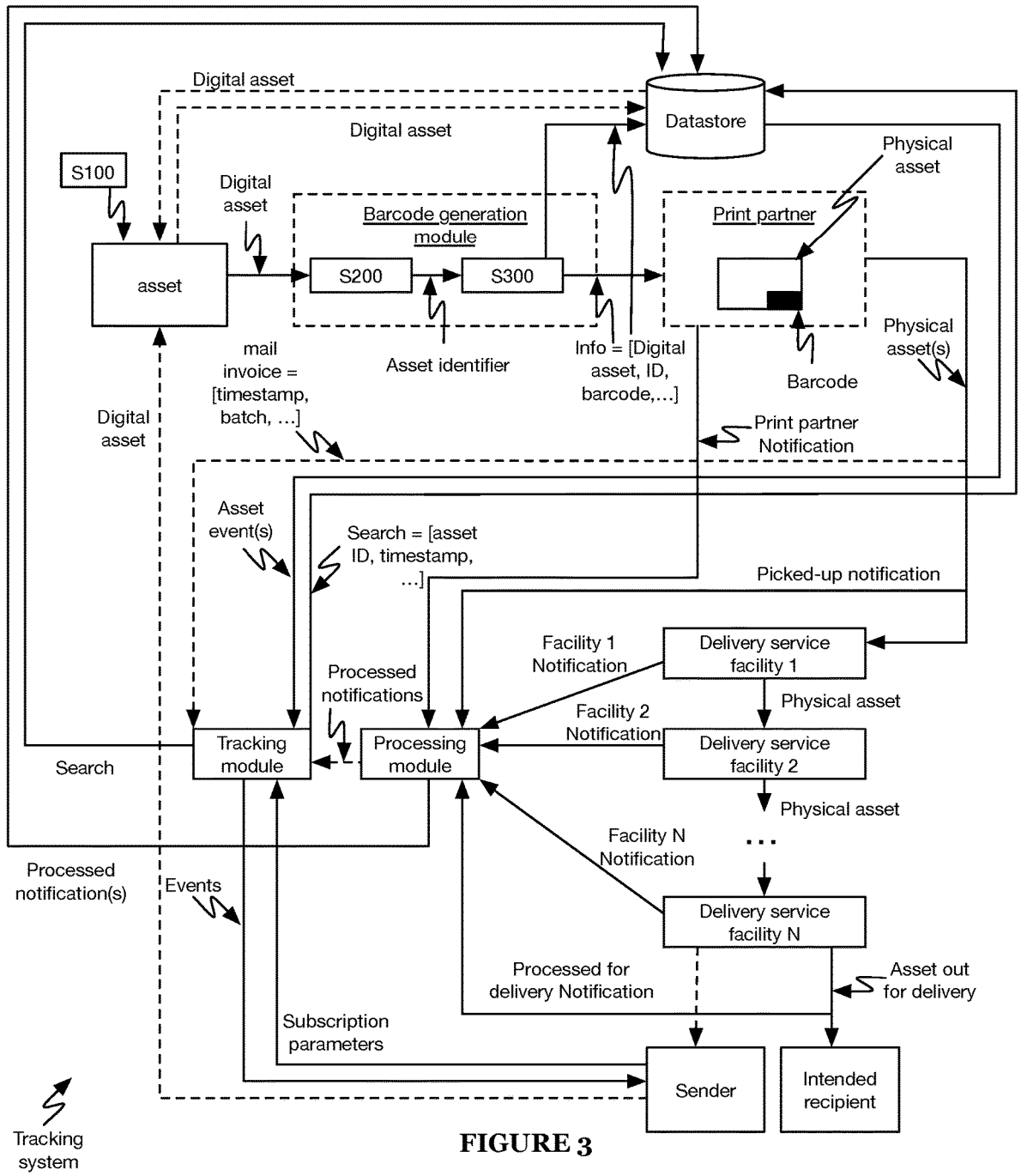
FIG. 3 is an embodiment of the method.

As shown in FIG. 3, in a third example, a digital asset can be received from the datastore (e.g., an order queue), an asset sender, and/or be otherwise received at the system. An asset identifier can be determined for the digital asset and used in S300, by the barcode generation module, and used to generate a barcode for the digital asset. The barcode can include routing information, ZIP code, the asset identifier, the system identifier, and/or any other suitable information. The asset barcode, asset identifier, digital asset, and/or any other suitable information can be stored in the datastore and/or transmitted to the print partner (e.g., the print partner queue, print partner datastore, print partner API, etc.). The print partner can print the asset and the asset barcode. The asset barcode can be printed directly on the asset, on a surface/sticker (e.g., adhered to the asset, an asset envelope, an asset packaging, etc.), and/or otherwise printed in association with the asset. The asset can be picked up by a delivery service (e.g., the asset part of a batch of physical assets). The delivery service (and/or print partner) can transmit an invoice to the tracking system, including a batch identifier, a pick-up timestamp, and/or any other suitable information. The delivery service can scan the physical assets and the scan can be associated with a pick-up notification received at the tracking system. The asset can be scanned at a series of delivery service facilities, wherein each facility can scan the asset and the scan can be associated with a delivery service facility notification. The asset can be picked up for delivery from a facility and scanned (e.g., when the asset is out for delivery, delivered, etc.). The scan can be associated with an out for delivery notification received by the tracking system. Throughout this printing and delivery process, the tracking system can infer asset events (e.g., from invoice receipt, from the invoice information, etc.) or translate (all or a subset of) the scan codes to asset events. The asset sender can subscribe to subscription parameters associated with the asset events, such that when a notification is processed by the tracking system, the asset sender will receive a notification of events associated with the subscription parameters.

3. Benefits

The method confers several benefits over conventional systems.

First, unlike conventional systems that track physical assets for asset recipients, the system and method can track individualized physical assets (e.g., commercial physical assets, bulk physical assets, advertising mail, etc.) associated with asset events (e.g., printed event, such as printed by a print partner; picked-up event; out for delivery event; return to sender event; etc.) for a sender. Tracking individualized physical assets is enabled by the tracking system, which generates unique asset barcodes for individual physical assets that include more information than conventional barcodes. Specifically, unused bits in a conventional barcode are replaced by the method and system with identification information unique to each asset. The unique asset barcode can be scanned, and the scan can be associated with notifications transmitted to the tracking system from the delivery service. The tracking system can determine asset events based on the unique identifiers encoded in the barcode and store the asset events in association with the asset identifier in the datastore. The sender can subscribe to events using subscription parameters received at the tracking system. When the tracking system determines asset events associated with the respective subscription parameters, the tracking system can notify the sender of the event.

Second, there does not exist a method for determining a timestamp for every asset event of interest for each asset (e.g., piece of mail), because some asset events of interest are associated with bulk asset manipulation (e.g., no "pick-up" event is generated for bulk asset pick-up, because delivery services pick up physical mail in batches). The inventors have discovered that they can associate the batch information (e.g., on the invoice, such as a batch identifier) with the invoice timestamp (e.g., pick-up timestamp) to determine a picked-up event (pick-up event) for each asset of a batch. The timestamp and associated asset event can be stored in association with the respective asset identifier in the datastore.

For example, senders oftentimes want to know when each piece of mail initially enters the mail stream (e.g., when it is picked up by a delivery person for transport to the delivery service facility, such as a sorting facility). Unfortunately, the earliest notification that delivery partners can provide on a per-mail-piece basis is arrival at the first automated delivery service facility, since it is manually infeasible for a delivery service worker to scan each and every piece of mail into the system at pick-up. This system automatically determines the picked-up event (e.g., asset pick-up event, mailed event).

However, the method and system can confer any other suitable benefits.

4. System

The method is preferably performed using the system 20 (example shown in FIG. 2), and can be used with: a system identifier, an asset, one or more third-party services, and/or any other suitable elements. The system can include: one or more routing systems, one or more tracking systems, one or more processing systems, one or more datastores, and/or any other suitable elements, such as to track digital physical assets using the system.

The system 20 can be used with a system identifier, which can function to uniquely identify the system. The system identifier can be used to generate the asset barcode, used to enable asset tracking, and/or be otherwise used. The system identifier is preferably the same for all mail pieces processed by the system (e.g., routed by the system), but can alternatively be different for different mail pieces, different senders, and/or otherwise vary.

The system 20 preferably includes an asset. The asset is preferably tracked by the routing system. The asset can be a digital asset, a printed asset (e.g., the digital asset printed by a print partner), and/or any other suitable asset. The asset is preferably a mail piece (e.g., a letter, a postcard, a mailer, etc.), but can alternatively be a package or other asset.

The asset can be associated with a batch. A batch is preferably a group of assets, different from an order, that can be transferred from a print partner to a delivery service. A batch can include physical assets from a plurality of orders, physical assets from a single order, and/or any other suitable digital physical assets. Each print partner can print one or more batches (e.g., concurrently or serially). A batch can be associated with a minimum volume (e.g., determined by a delivery service, determined by the print partner, and/or otherwise determined). The minimum volume can be of: individual physical assets, individual digital asset proofs (e.g., a unique asset design), and/or any other suitable asset unit. A batch can be associated with a timeframe (e.g., single business day, span multiple days, etc.).

Asset association with a batch can be determined by the routing system based on batch requirements associated with a batch, or otherwise determined. Batch requirements can include acceptable parameter values for a given batch (e.g., acceptable parameter values that can be printed together on the print partner machinery). The batch requirements preferably specify values for a subset of the asset parameters, such that a batch can include digital assets with different permutation parameter values, but can additionally or alternatively specify values for the full set of asset parameters. Batch requirements can be stored in the datastore, more specifically the module datastore, and/or otherwise stored. Batch requirements can be specified by each print partner's machinery capabilities, machine setup, manually (e.g., specified by a print partner, by a system administrator, etc.), automatically determined (e.g., specified by machine; determined based on: the type of machines associated with the print partner, the machines' possible configurations, the batch parameters associated with each configuration, the machine setup required to print the digital physical assets in an existing batch, etc.), and/or otherwise determined. Batch requirements can be received through a graphical user interface (GUI), a machine interface, or any other suitable interface. The GUI is preferably configured to collect batch requirements for the routing system (e.g., information regarding print partners, regarding modules of the routing system, etc.). The batch requirements can be received: over a wired or wireless connection (e.g., the Internet), a CAN or field bus, and/or any other suitable connection. However, a batch can include any other suitable elements.

The asset can be associated with an order. Each order preferably includes one or more digital versions of physical assets, an associated order volume (e.g., number of digital versions), one or more timestamps (e.g., time at which the order was received, maximum time allocation for time of order receipt to print, etc.), but can additionally or alternatively include any other suitable information. Assets of an order can be routed to different print partners by the routing system. Assets of an order can be associated with different picked-up events (e.g., enter the mail stream at different times) or they can be associated with the same picked-up event. However, an order can include any other suitable elements.

Each asset can be associated with an asset identifier. The asset identifier can be unique to the asset (e.g., globally unique, temporally unique, unique within the batch, unique within the system, etc.), or non-unique (e.g., shared with other physical assets, such as physical assets generated from the same asset originator order). The asset identifier can be re-used after the asset is delivered (or after another asset event has occurred, after a predetermined amount of time), and/or not be re-used. The asset identifier can optionally identify the system 20, such that the delivery service can forward asset data (e.g., scan events, scan codes, etc.) to the system 20. Alternatively, the asset identifier can exclude a system identifier, wherein the system can pull asset data from the delivery service based on the asset identifiers stored by the system 20. However, the asset identifier can be associated with any other suitable characteristic.

The asset can be associated with an asset barcode, other visual identifier (e.g., QR code, etc.), wireless identifier (e.g., NFC tag, Bluetooth tag, etc.), or other identification mechanism. The asset barcode (and/or identification mechanism) can include (e.g., encode) the asset identifier. The asset barcode can include a ZIP code (e.g., asset origination ZIP code, asset receipt ZIP code, and/or any other suitable ZIP code). The asset barcode can include routing information (e.g., a path of particular delivery service facilities to be delivered at a recipient address). In variants, the routing information can be associated with a set of expected asset events, and optionally, a set of time windows for each of the expected asset events. The barcode can additionally or alternatively include any other suitable information. The asset barcode can be generated by the barcode generation module of the tracking system, but can additionally or alternatively be generated by the delivery service, the print partner, and/or be otherwise generated. The asset barcode is preferably scannable by a delivery service. However, the asset barcode can be associated with any other suitable elements.

The asset can be associated with asset information. Examples of asset information that the asset can be associated with include: asset barcode; asset identifier; batch identifier; order identifier; sender identifier; asset events, such as codes and/or standardized asset event labels; timestamps; intended recipient information; and/or any other suitable information.

However, the asset can additionally or alternatively be associated with any other suitable information or data.

The system 20 preferably includes one or more third-party services, which can include one or more printers (e.g., print partners), delivery services (e.g., delivery service facilities), and/or any other suitable service. The third-party services can include a set of print partners. The print partners can print digital physical assets and respective asset barcodes (e.g., on the asset packaging, on the asset itself, etc.). A print partner can receive the asset from the system 20 after the system 20 assigns the asset to the print partner. Each print partner can include one or more servers that can store physical assets assigned to the print partner. The print partners can transmit notifications (e.g., string, csv, values, data streams, etc.) to the tracking system. The notifications can include information relevant to the state of the asset in the print partner queue, an expected print timestamp, an expected pick-up time, and/or any other suitable information.

The third-party services can include a set of delivery services. The delivery services can receive batched assets (e.g., a plurality of physical assets) from each print partner. The batched assets can be associated with a threshold minimum volume, maximum volume, and/or not be associated with a threshold volume. The physical assets of the batch can be associated with a batch identifier for the assigned batch.

Each delivery service can determine an invoice for a particular asset batch. The invoice is preferably generated (and received by the system) after asset batch pick-up from the print partner, but can be generated or received at a predetermined time after asset batch pick-up, after a predetermined event (e.g., after asset delivery), or at any other suitable time. An invoice can include the batch parameters, such as the volume of the batch; batch identifier; asset identifiers, such as associated with the printed physical assets of the batch; pick-up timestamp; print partner that printed the batch; pickup geolocation; and/or any other suitable information.

Each delivery service can scan an asset (e.g., the asset barcode, asset identifier) one or more times (e.g., 2 times, 3 times, 5 times, 10 times, 15 times, etc.). After a delivery service scans an asset, a notification (e.g., string, csv, etc.) associated with the asset can be received at the system 20 in real-time, within a predetermined time window, or at any other suitable time (e.g., using a push notification, pull request, or other request). A scanned event can be determined by the system based on the notification. An asset can be scanned when: the asset is picked up by the delivery service from the print partner; when the asset is out for delivery; when the asset is en route to or received at a delivery service facility; and/or at any other suitable time. An asset can be scanned by a machine located at a delivery service facility, by a machine operated by an asset delivery person, and/or by any other suitable system.

Each delivery service can be associated with a delivery service API. A delivery service API can interface with the system (e.g., using delivery service authentication or authorization credentials stored by the system, using system authentication or authorization credentials stored by the delivery service, etc.). The delivery service API can send information to the system (e.g., an invoice, a notification associated with an asset, etc.). The delivery service can additionally or alternatively receive information from the system. The delivery service API can additionally or alternatively otherwise interface with the system and/or directly interface with a sender API or GUI. The information can be: pushed from the delivery service, pulled from the delivery service (e.g., returned in response to a request sent by the system), or otherwise provided to the system.

The system can interact with or include one or more senders, which function to determine digital assets (e.g., originate, forward to the system, etc.) and/or receive tracking information for physical assets. Senders can include people, asset generation services, a sender API, and/or any other suitable sender. Senders can receive asset event information associated with subscription parameters. Subscription parameters can include: a sender identifier, batch identifier, event identifier (e.g., associated with a tracking code), order identifier, asset identifier, time period, and/or any other suitable parameters. Senders can subscribe to one or more asset events using webhooks, using an automated query, a sender generated query, authentication and/or authorization credentials, and/or otherwise subscribe to asset event information.

A webhook can push information to the sender after detecting an event associated with the subscription parameters. The webhook can additionally or alternatively pull information from the datastore based on subscription parameters.

The automated query can query the datastore on a predetermined interval (e.g., W day, 1 day, 2 days, 5 days, etc.), in response to occurrence of a query event (e.g., a request from a sender system), and/or at any other suitable time. The automated query can include predetermined subscription parameters for the sender (e.g., associated with the query). However, the automated query can include any other suitable elements.

However, senders can be otherwise defined.

The system can interact with or include one or more recipients, which function to receive the asset. A recipient is preferably associated with a recipient address, which is associated with the asset (e.g., the address which the asset is mailed to). However, recipients can be otherwise defined.

However, third-party services can additionally or alternatively include any other suitable entity.

The system 20 preferably includes one or more routing systems. The routing system preferably functions to determine a batch, associated with a print partner, for a digital asset. The print partner can be associated with multiple batches or a single batch. The routing system can determine batches for multiple physical assets in parallel or in series. Physical assets of the same order can be routed to different batches of the same print partner and/or different print partners (e.g., thereby causing physical assets of the order to enter the mail stream at different times). However, the routing system can otherwise route individual physical assets from the (same or different) asset originators to the (same or different) print partners for physical asset creation. An example of the routing system is described in US application Ser. No. 17/127,125 filed 18 Dec. 2020 and titled METHOD AND SYSTEM FOR AGGREGATE ASSET ROUTING, which is incorporated herein in its entirety by this reference.

The system 20 preferably includes a tracking system. The tracking system preferably functions to process information from a delivery service using the processing module; track asset events for physical assets using the tracking module; and generate asset barcodes using the barcode generation module, but can additionally or alternatively perform any other suitable set of functionalities.

The tracking system preferably includes a set of modules. The set of modules can include a tracking module. The tracking module preferably functions to perform S500 and S600. Additionally or alternatively, the tracking module can subscribe to a feed (e.g., stream of events) from the database.

The tracking module can query/search the database using an API. The query can include using a search engine. The query can include a set of parameters. The set of parameters can include the asset identifier of the asset, a timestamp (e.g., of the most recent previous event associated with the asset identifier, of the picked-up event, and/or any other suitable timestamp), an event identifier, and/or any other suitable parameter.

The set of modules can include a processing module. The processing module preferably functions to process the notification(s) comprising a batch of scanned events, such as received from a plurality of delivery services and/or delivery service facilities. The notifications can include information such as the asset identifier, ZIP code, event identifier, and/or any other suitable information. The processing module can optionally infer events from auxiliary data. The processing module can additionally or alternatively perform any other suitable set of functionalities.

The set of modules can include a barcode generation module which functions to generate a barcode for the digital asset based on the asset identifier, routing information, and/or any other suitable information. The barcode generation module can additionally or alternatively perform any other suitable set of functionalities.

The set of modules can include an event validation module. The event validation module preferably functions to confirm that asset events associated with asset identifiers occurred as expected for the physical physical assets (e.g., picked-up event, location events, received by recipient event, etc.); functions to determine when an asset is not associated with an expected event for the physical asset (e.g., return to sender, no event data for the asset for a predetermined period, etc.); functions to evaluate the output of the event estimation module (e.g., provide an error metric); and/or functions to determine data, such as training data, validation data, and/or test data. The data can be labelled (e.g., with the asset state, with binary 1/0 to indicate that the asset event occurred, such as the asset was delivered to/received by the intended recipient, etc.) and/or unlabeled. The data can be used by the event estimation module and/or any other suitable module or system. The event validation module can additionally or alternatively perform any other suitable functionalities and/or include any other suitable elements.

The set of modules can optionally include an event estimation module. The event estimation module preferably functions to estimate an asset state (e.g., as the asset is routed to the recipient). The event estimation module can estimate the asset state and/or asset event occurrence based on: prior mail history for the asset, historical trends for the same route or same asset event, heuristics, a rule set, and/or any other suitable data. The event estimation module can include a learning module. The learning module can process the data received from the event validation module. The learning module can be a stochastic model, a neural network, and/or any other suitable state estimation network and/or model. The event estimation module can additionally or alternatively perform any other suitable functionalities and/or include any other suitable elements.

However, the set of modules can additionally or alternatively include any other suitable module.

The tracking system can interface with an events API. The events API can be associated with the datastore. The events API can receive information (e.g., asset events, physical assets, etc.) from the datastore. The events API can receive and respond to queries (e.g. from sender endpoints). The events API can generate event streams (e.g., on a per order ID basis, per asset ID basis, etc.), wherein the tracking system can subscribe to the event streams. The events API can additionally or alternatively perform any other suitable functionalities and/or include any other suitable elements.

The tracking system can transmit asset events to a dashboard; a sender API; directly to a sender via a push notification, a phone call, an email; and/or otherwise transmit asset events to a sender.

However, the tracking system can be otherwise configured.

The system 20 preferably includes one or more processing systems, which can function to execute the one or more modules of the system. The processing system can be localized or distributed. The processing system can include one or more processors (e.g., PCB, CPU, GPU, etc.). The processing system can include one or more pieces of computer memory (e.g., non-volatile memory, such as RAM or Flash; volatile memory; etc.). However, the processing system can be otherwise configured.

The system 20 can include one or more datastores. The datastore can be a relational database (RDS) (e.g., schema based), such as for storing asset events, but can additionally or alternatively be a NoSQL database, such as for storing analytics, webhooks and/or any other suitable information, and/or any other suitable database. The datastore can have a configuration, such as distributed and/or centralized, but can additionally or alternatively have any other suitable configuration.

The datastore preferably stores the asset. The asset is preferably accessible in the datastore based on the asset identifier of the asset. The asset is preferably stored with additional information. The additional information can include the asset barcode, asset parameters, auxiliary data, and/or any other suitable information. However, the asset need not be stored with additional information (e.g., when the asset is enqueued in an order queue of the datastore).

The datastore can additionally store asset events and associated event identifiers; processed and/or unprocessed delivery service notifications; an order queue (from which to receive orders in S200); and/or any other suitable information.

The system can include multiple datastores for storing different types of information, such as for storing tracking information, analytics, and webhooks, but can alternatively include a single datastore for storing the information.

The datastore can be associated with search clusters (e.g., Elasticsearch clusters).

However, the datastore can include any other suitable elements.

5. Method

The method for tracking physical assets can include: receiving a digital asset S100; determining an asset identifier for the digital asset S200; generating an asset barcode S300; optionally facilitating printing and sending of the asset to an asset recipient S400; determining an asset event for the asset S500; notifying a sender of an asset event S600; and/or any other suitable elements.

5.1 Receiving a Digital Asset S100.

Receiving a digital asset S100 can function to obtain a digital version of the mail to be printed and delivered. The digital asset is preferably received by the system 20, and more preferably by the routing system or barcode generation module, but can additionally or alternatively be received by the datastore (e.g., in the order queue). The order queue can dequeue digital physical assets of orders to be received during S100. The digital asset can be received from the sender and/or an asset sender system (e.g., via an API of the system), the routing system, and/or from any other suitable entity or system. S100 can be performed concurrently with S200, before S200, after S200, and/or at any other suitable time. The digital asset can be programmatically generated from html (e.g., with different variables specifying different visual parameters or values to insert into an asset proof template), received as a JSON object, and/or be otherwise determined. The digital asset is preferably associated with recipient information, such as the recipient address, a recipient identifier (e.g., that uniquely identifies the recipient at the sender endpoint), and/or any other suitable asset information. The digital asset can be associated with a sender endpoint, such as the asset originator, a subscriber, or any other suitable endpoint using a sender identifier. S100 can include storing the digital asset in the datastore.

S100 can include receiving multiple digital physical assets from the same order and/or from different orders. The digital physical assets can be processed by S100 contemporaneously or in series.

Figure 5:
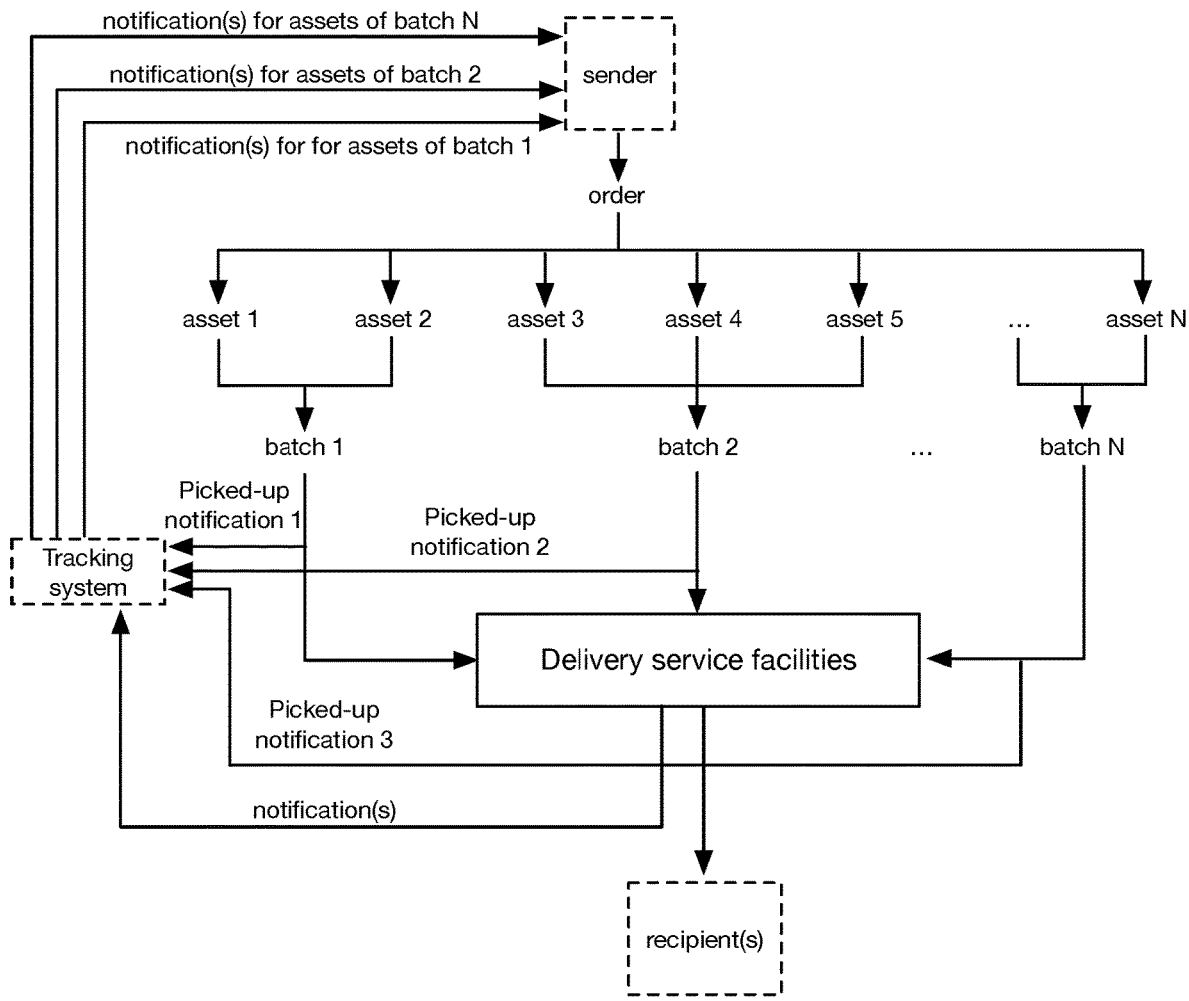
FIG. 5 is an embodiment of the method.

S100 can include receiving an order, which can include a plurality of digital physical assets. Each asset can be individually processed by the routing system, such that physical assets of an order can be assigned to different batches, printed by different print partners, and picked up by delivery services at different times (e.g., as depicted in FIG. 5). Alternatively, physical assets of an order can be assigned to the same batch and printed by the same print partner and/or otherwise distributed by the system.

However, the digital asset can be otherwise received.

5.2 Determining an Asset Identifier for the Digital Asset S200.

Determining an asset identifier for the digital asset S200 can function to enable individualized asset tracking. The asset identifier is preferably a unique identifier (e.g., globally, temporally, per third-party service, such as per print partner, etc.). The asset identifier can be: determined based on the asset information, the sender information, the system identifier, the delivery route, the batch information (e.g., batch identifier), order information (e.g., order identifier, order timestamp, etc.), and/or other asset data; randomly generated; and/or otherwise determined. The asset identifier can be received from the routing system, generated by the tracking system, and/or otherwise determined. The asset identifier can be stored in the datastore, such as to uniquely identify the digital asset. The asset identifier can be stored in association with the digital asset, the sender identifier, the asset parameters, the print partner, the delivery partner, the asset events, and/or any other suitable information. The asset identifier is preferably used as a unique key to store asset information in the datastore and/or query the datastore for asset information. The asset identifier can be associated with a batch and/or a print partner by the routing system and/or by any other suitable system. However, the asset identifier can be otherwise determined, stored, and/or used.

In a first variation, the asset identifier can be generated from the asset parameters. For example, the asset identifier can be a hash of the asset's parameter values, the sender identifier, and/or other information.

In a second variation, the asset identifier is determined based on the sender. For example, the asset identifier can include: a sender identifier, an incremental identifier (e.g., unique for the sender identifier), and/or other information.

In a third variation, the asset identifier is determined based on a globally incremented identifier (e.g., wherein each mail piece is assigned the next identifier).

However, the asset identifier can be otherwise determined.

5.3 Generating an Asset Barcode for the Asset S300.

Generating an asset barcode for the asset S300 can function to generate an asset barcode for which to track the asset as the asset is routed to the intended recipient (e.g., scanned by the delivery service at various checkpoints including delivery service facilities, delivery service pick-up from a printer, delivery, etc.). The asset barcode preferably functions to associate a physical asset with the digital asset, more specifically the asset identifier, and additionally or alternatively a system identifier, an order identifier, a batch identifier, and/or any other suitable identifier(s). The asset barcode can be an IMB, IMPB, EAN-128, Code 128, GS1-128, RM4SCC, MaxiCode, EAN-8, EAN-13, EAN-14, UPC-A, JAN, ISBN-10, ISBN-13, ISSN, Code 39, PZN, and/or any other suitable barcode.

S300 is preferably performed by the barcode generation module, but can additionally or alternatively be performed by the delivery service, the print partner, and/or be otherwise performed.

S300 is preferably performed after determining the asset identifier in S200, but can additionally or alternatively be performed contemporaneously with S200, and/or at any other suitable time.

S300 can receive the asset identifier from S200. S300 can receive the ZIP code, routing information, and/or any other information associated with the asset from S100 (e.g., in addition to receiving the asset). S300 can additionally or alternatively receive any other suitable information.

In a first variant, the asset barcode can include system information, asset information, and delivery service information. Examples of the asset barcode are depicted in FIGS. 4A and 4B.

Figure 4A:
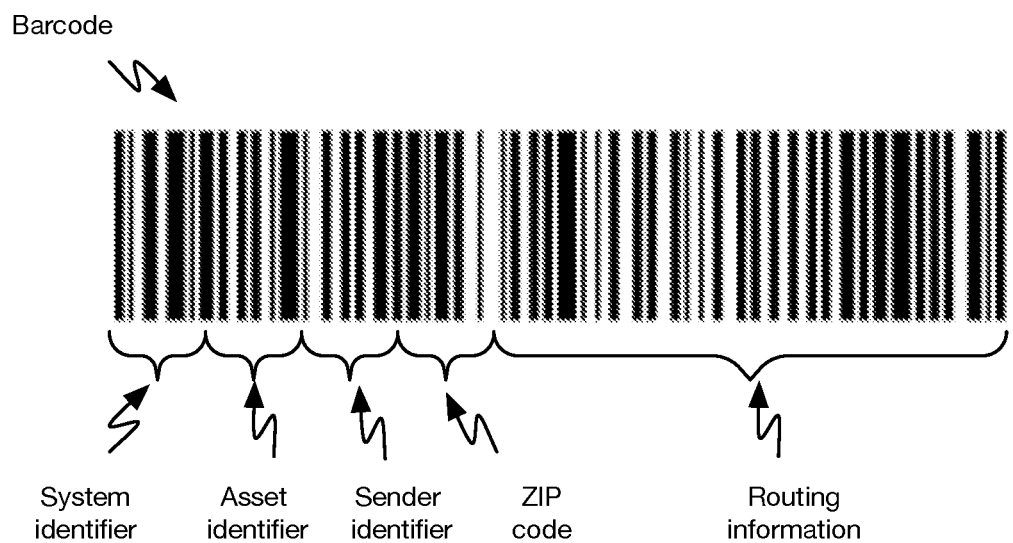
FIGS. 4A-4B depict variants of a barcode.

As depicted in FIG. 4A, the asset barcode can include the system identifier, the asset identifier, a sender identifier, the ZIP code, and routing information. The system identifier can be appended to the asset identifier, part of the asset identifier, separate from the asset identifier, and/or be otherwise related to the asset identifier. The sender identifier can be appended to the asset identifier, part of the asset identifier, separate from the asset identifier, and/or be otherwise related to the asset identifier.

Figure 4B:
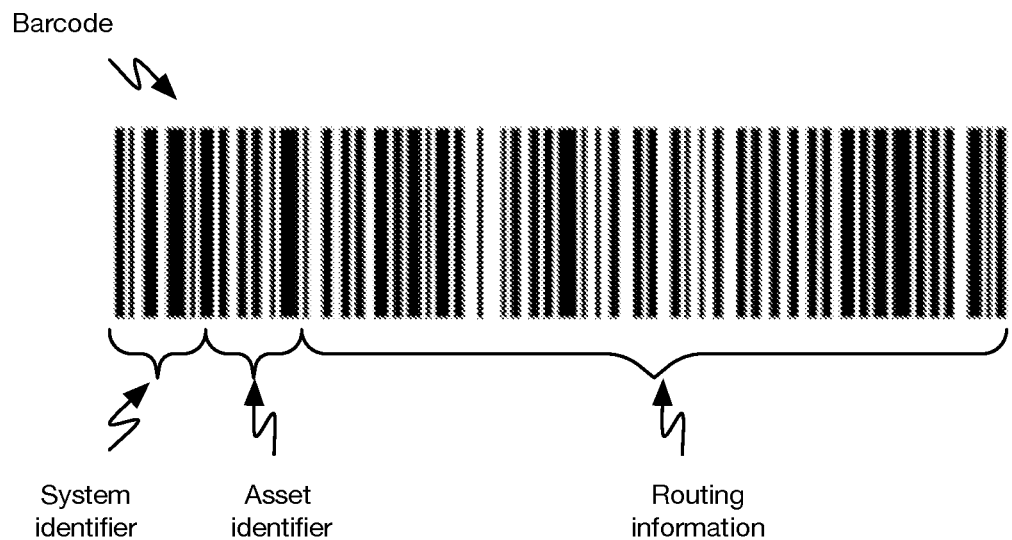

As depicted in FIG. 4B, the asset barcode can include an asset identifier, a system identifier, and routing information, and/or any other suitable information In a second variant, the asset can include multiple barcodes, which can include a delivery service barcode, a sender barcode, and/or any other suitable barcode. The multiple barcodes can be scannable by the delivery service, the recipient, such as by a device, and/or be otherwise scannable. For example, the sender barcode can be scanned by the recipient (e.g., to determine a delivered event, confirm a delivered event, etc.).

However, the asset barcode can be otherwise generated.

5.4 Facilitating Printing and Sending of the Asset to an Asset Recipient S400.

Facilitating printing and sending of the asset to an asset recipient S400 can function to print, deliver, and/or assist in delivery of the asset to a recipient. S400 is preferably performed after S300, and/or at any other suitable time. S400 can include: sending a digital version of the asset to a selected print partner (e.g., determined by the routing system), wherein the print partner prints and sends physical versions of the asset to the delivery service. The asset can be printed as a batch, delivered as a batch to the delivery service, and/or otherwise associated with other physical assets. The asset barcodes are preferably printed on the respective assets by the print partner, but can alternatively be otherwise associated with the respective asset. The digital version of the asset can be printed with the generated asset barcode. When the digital asset is picked up and/or handled by the delivery service, the asset barcode of the digital asset can be scanned (e.g., representative of a picked-up event), which can trigger a notification transmission to the system 20 (e.g., as shown in FIG. 3).

In one such variant of sending the asset to the print partner, after a digital asset is associated with a print partner and an asset barcode (e.g., the asset barcode determined in parallel, determined in series, etc.), the asset can be enqueued at the respective print partner queue.

However, the asset can be otherwise printed and sent to an intended recipient.

5.5 Determining an Asset Event for an Asset S500.

Determining an asset event for an asset S500 can function to digitally track a physical asset as the asset is routed to an intended recipient. S500 can additionally or alternatively perform any other suitable functionalities.

S500 is preferably performed by the tracking system, and more preferably, by the tracking module, but can additionally or alternatively be performed by any other suitable system.

S500 can be performed for a plurality of physical assets contemporaneously or in series.

S500 is preferably performed after S300, but can additionally or alternatively be performed contemporaneously with S300. S500 is preferably performed contemporaneously with S400, but can additionally or alternatively be performed after S400. S500 is preferably performed after an asset is printed by the print partner, but can additionally or alternatively be performed before the asset is printed by the print partner (e.g., process-to-be-printed event). S500 can be performed once per asset, such as corresponding to a single event (e.g., picked-up event, out for delivery event, received event, etc.), performed a plurality of times per asset (e.g., 2, 3, 5, . . . , N) depending on the number of events for the particular asset, or performed any other suitable number of times. S500 can be performed after a scan notification is received from the delivery service. However, S500 can additionally or alternatively be performed at any other suitable time.

S500 is preferably performed based on: the asset (e.g., the physical asset), asset events (e.g., asset event identifiers/codes), asset event descriptions, and/or subscription parameters (e.g., determined in S600), but can additionally or alternatively be otherwise based.

S500 preferably includes receiving notifications from the delivery service and/or print partner. Processing the notifications can include, at the processing module of the tracking system, processing the notification data into a new data format. In one such example, processing the notification can include processing the notification into an object (e.g., software object) such as a JSON object, YAML object, and/or any other suitable object. The notification data is preferably received by an API, but can additionally or alternatively be received by a GUI, and/or by any other suitable interface. The notification data in the new data format can be stored in the datastore, but additionally or alternatively the notification data can directly stored in the datastore, and/or not stored in the datastore. In one variant, storing the set of event identifiers can include filtering out a predetermined set of codes (e.g., unmapped codes), such that only events associated with mapped and/or desired codes are stored in the datastore. Additionally or alternatively, all codes (and/or associated asset events) can be stored in the datastore.

Asset events are preferably events associated with an asset identifier of the asset. Asset events are preferably human-readable (e.g., descriptive strings), but can additionally or alternatively be alphanumeric codes or have any other suitable construction. The asset events are preferably of interest to the sender endpoint, but can be of interest to the recipient, and/or any other entity. The asset events preferably include a subset of the scan codes provided by the delivery service (e.g., associated with the asset identifier or asset barcode scanned by the delivery service), but can additionally or alternatively include all, none, or any other suitable number of the scan codes provided by the delivery service. The asset events preferably include events outside of the scan codes provided by the delivery service (e.g., picked-up events, delivery events, etc.), wherein the non-scan code events can be determined from other sources (e.g., recipient, API, etc.) or estimated (e.g., based on scan code events, historical data, etc.), but can additionally or alternatively be limited to the scan codes.

Asset events can include: picked-up events, in-transit events, in-local-area events, processed-for-delivery-events, re-routed events, returned-to-sender events, print events, received-by-recipient events, and/or any other suitable event.

A picked-up event for an asset is preferably when an asset enters the mail stream (e.g., the asset is picked up for delivery by a delivery service, after being printed by a print partner). The picked-up event can be determined from an invoice received from a delivery service (e.g., matching the batch identifier on the invoice with a batch identifier associated with assets routed by the system and using the invoice timestamp as the pick-up timestamp associated with a picked-up event). Additionally or alternatively, the picked-up event can be inferred based on occurrence of another event associated with the asset (e.g., an in-transit event; in-local area event; or other event associated with scanning the barcode of the asset, such as at a delivery service facility, during pick-up at a print partner, etc.; etc.) A picked-up event can provide auditable proof of time of mailing and/or any other information.

In-transit events can be when the asset is being processed at the origin facility (e.g., scanned at the origin facility), but can optionally include any other location events (e.g., when the physical asset is scanned at any other intermediary delivery service facility), or any other suitable event.

In-local-area events can be when asset is being processed at a destination facility (e.g., within a predetermined distance from the recipient address, such as within 30 miles, 50 miles, 70 miles, 100 miles, etc.).

Processed-for-delivery events can be when the asset is ready for delivery at a nearest postal facility to the recipient address and/or a postal facility within a predetermined distance to the recipient address (e.g., 10 miles, 20 miles, 30 miles, 40 miles, 50 miles, etc.).

Re-routed events can be when the asset is being re-routed due to recipient change of address, address errors, re-determining the barcode (e.g., by the delivery service), and/or otherwise re-routed.

Returned-to-sender events can be when the asset is being returned to sender due to an error (e.g., address error, barcode error, identifier error, etc.). A returned-to-sender event can be determined based on a code received from a print partner, inferred based on a series of events (e.g., processed-for delivery event followed by an additional in-local-area event, in-transit event, re-routed event, any other event associated with a delivery service facility, etc.), reported by the sender, and/or otherwise determined.

Print events can be when the asset has been printed by the print partner, but before the asset has entered the mail stream (e.g., picked up by the delivery service).

Received-by-recipient events can be indicative of when the mail piece is received by a recipient. Received-by-recipient events can be inferred based on past events associated with the mail piece. For example, received-by-recipient event can be inferred based on a predetermined period after a processed-for-delivery event (e.g., 1 hour, 2 hours, 3 hours, 4 hours, 5 hours, 8 hours, 12 hours, 24 hours, etc.). Alternatively, received-by-recipient events can be determined from a scan code, from a geolocation of the delivery system (e.g., when the delivery system geolocation is substantially collocated with the asset's recipient address), or otherwise determined.

Asset events can additionally or alternatively include any other suitable events associated with the asset.

In a first variant, S500 includes determining an asset event from data received from the delivery service. In this variant, information received from a delivery service can include a CSV; string; object, such as a JSON object, YAML object, and/or any other suitable object; and/or any other suitable data format. The information can include fields such as asset identifier, event identifier (e.g., associated and/or mapped with a human readable event), ZIP code, timestamp (e.g., time of scan), and/or any other suitable field. The information can include auxiliary information (e.g., extracted from an invoice, a notification, etc.). Information can be extracted from the invoice by: extracting values from the fields of a digital invoice, extracting metadata values, extracting data from an OCR'ed invoice, or otherwise extracted. The information can include an API subscription stream/webhook. However, S500 can receive any other suitable information. The information, received by S500 (or a subset thereof), can be converted into human readable information associated with the asset event for the asset using an identifier-to-event map, trained algorithm, or other conversion module. The human readable information can be used in S600, and/or be otherwise used.

In a first embodiment, the system can receive a delivery service code, interpret one or more delivery service codes into a symbolic representation (e.g., human-readable), and store and/or notify the sender, using symbolic representation. The symbolic representation can be determined using a database, library, translator, and/or otherwise determined.

S500 can include determining an asset event for an asset identifier based on the notifications, wherein the respective asset identifier is marked with a picked-up event, with the pick-up timestamp, and/or with any other suitable information extracted or inferred from the notification. In a first variant, determining an asset event can include determining a set of event identifiers, each identifier associated with a different asset event, for the asset identifier. Determining a set of event identifiers can be based on a predetermined identifier-to-event map, or otherwise determined.

In a second variant, determining an asset event can include determining asset events from auxiliary data associated with the asset event. In one embodiment, the asset event can be a picked-up event. In a first example, determining a picked-up event can include receiving an invoice from a delivery service. The invoice can be for a batch of physical assets picked up by a delivery service from a print partner. The invoice can include a pick-up timestamp, the batch parameters, and/or any other suitable information. Determining a picked-up event can additionally include: determining the batch associated with the invoice (e.g., based on a batch identifier provided by the system to the print partner and/or delivery service and extracted from the invoice; the print partner for the batch; the invoice timestamp and estimated batch ship time; etc.); determining the asset identifiers associated with the batch; and marking the respective asset identifiers in the datastore with a picked-up event, with the pick-up timestamp, and/or with any other suitable information extracted or inferred from the invoice. In a second example, determining a picked-up event can include receiving a notification for the batch from the delivery service or print partner, which indicates that the batch is received at the delivery service. The notification can include a timestamp corresponding to the pick-up time, but the notification need not include a timestamp, in which case the timestamp of the notification can be used. Determining the picked-up event can additionally or alternatively include marking the asset identifier in the datastore with a picked-up event, with the pick-up timestamp, and/or with any other suitable information extracted or inferred from the notification. In a third example, determining the picked-up event can include receiving a notification for the asset identifier from the delivery service. In a fourth example, determining the picked-up event can include receiving a shipped notification from the print partner at a first timestamp, optionally confirming the shipped notification in response to receipt of an invoice from the delivery service, and updating the asset identifier with a picked-up event and the first timestamp.

In a third variant, determining an asset event can include inferring an asset event from the current or historical data associated with the asset identifier (e.g., predetermined period of time after a previous first known asset event, the predetermined period associated with a probability that a second known asset event has occurred, etc.). In a first example, after a predetermined period (e.g., W day, 1 day, 2 days, etc.) of an out for delivery event, there can be a predetermined probability of a received event (e.g., 0.5, 0.75, 0.95, etc.) respective to the predetermined period, wherein the asset identifier is updated with the received event after the probability exceeds a predetermined threshold (e.g., above 0.5, above 0.6, above 0.7, above 0.8, above 0.9, etc.). In a second example, auxiliary data can include an invoice receipt associated with asset pick-up. The system 20 can automatically generate a picked-up event based on the invoice receipt. In a third example, auxiliary data can include asset delivery data, such as a threshold timeframe, which defines a timeframe for expected asset delivery. The system 20 can automatically generate an asset delivery event based on the asset delivery data. However, S500 can additionally or alternatively otherwise infer asset events from auxiliary data.

S500 can optionally include storing the asset event in association with the asset identifier in the datastore, but can additionally or alternatively include storing the asset event in association with any other suitable subscription parameter.

S500 can include filtering out notifications that include unmapped scan codes; converting scan codes to standardized asset event labels (e.g., human-readable labels); and/or include any other suitable process or not process the notifications (e.g., directly store the notifications in the datastore).

In a fourth variant, an asset event can be inferred from asset events from other physical assets in the same batch. For example, when an asset event has been received for more than a threshold proportion of assets within a batch, the asset event can be propagated to the other asset identifiers within the batch (e.g., wherein the asset event can be associated with batch-level processing by the delivery service).

However, an asset event can be otherwise determined.

The method can optionally include performing analytics based on one or more tracked events (e.g., delivery speed, asset distribution, etc.). The analytics can be determined based on the one or more tracked events, historical tracked events, and/or any other suitable data. The analytics can be performed by the event estimation module and/or any other suitable module.

In a first embodiment, a delivery speed for an asset can be calculated based on a first timestamp associated with a picked-up event and a second timestamp associated with a processed-for-delivery event, based on delivery speeds for previous physical assets delivered to the same zip code (e.g., historical asset data), and/or based on any other suitable information. Additionally or alternatively, the delivery speed for multiple different physical assets can be averaged to determine a delivery speed per zip code, per region, per delivery service, and/or per any other element.

In a second embodiment, a delivery speed can be estimated based on historical speeds between facilities, average time to print, average time between a final facility and a recipient address, and/or any other time period.

In a third embodiment, an asset distribution can be a geographic path that an asset takes from a printer to a recipient address, which can be determined based on asset barcode scans at delivery service facilities.

5.6 Notifying a Sender Regarding an Asset Event Associated with the Asset S600.

Notifying a sender regarding an asset event associated with the asset S600 can function to enable asset tracking (e.g., asynchronous communication with a sender regarding asset events). S600 is preferably performed by the tracking system, but can be performed by any other suitable system. The tracking system can additionally analyze events for all physical assets (or a subset thereof) associated with the sender, and/or an order received from the sender, and transmit the analysis to the sender. S600 can additionally or alternatively be performed by any other suitable system.

S600 can be performed after detecting an asset event by the tracking system in S500 and/or after a predetermined period, such as after multiple events (e.g., W day, 1 day, 2 days, etc.). Additionally or alternatively, S600 can be performed after a sender pulls and/or queries an event status associated with a search parameter from the tracking system. S600 can additionally or alternatively be performed at any other suitable time.

S600 can be performed based on notification preferences (e.g., using webhooks) specified by the sender, performed for all events associated with assets associated with the sender, and/or otherwise performed. A sender can subscribe to a particular asset event through a webhook associated with the asset event. In a first example, the sender can be notified of an asset event after the sender subscribes through a webhook associated with the asset event.

S600 can include notifying a sender of multiple asset events associated with an asset. S600 can include notifying a sender of asset events associated with an order (e.g., total delivered physical assets, total returned to sender physical assets, etc.). S600 can include notifying multiple senders of asset events for their respective physical assets contemporaneously or in series.

S600 can receive asset events associated with search parameters from S500. S600 can transmit the asset events to the sender via a push notification to a sender device, a request, a phone call, to a dashboard accessible by the sender, to a sender API, and/or otherwise notify the sender of asset events. The asset events can be sent as a message, an array, audio, and/or in any other data structure.

S600 can be performed based on an asset event determined in S500, but can additionally or alternatively be based on a notification received from the sender (e.g., query for information regarding an asset, an order, subscription to an event stream for an asset, for an order, etc.), and/or otherwise based. S600 can include monitoring the system 20 for asset event occurrence (e.g., for a search parameter).

In a first variant, S600 can include periodically searching the datastore (e.g., every 1 minute, 10 minutes, day, week, at a predetermined frequency, on a predetermined schedule, etc.). Periodically searching the datastore can include determining an asset event for an asset identifier (e.g., associated with a sender, associated with an undelivered state, etc.) or any other search parameter(s).

In a second variant, S600 can include a sender subscribing to an event stream associated with an identifier (e.g., asset identifier; batch identifier, wherein the asset identifier is associated with the batch identifier; order identifier; and/or any other suitable identifier). The sender can subscribe to an event stream via an interface (e.g., API, GUI, third-party notification service, and/or any other suitable interface). The sender can receive notifications in response to a receipt of an asset event at the interface.

In a third variant, a most recent asset event can be used to update a status for an asset (e.g., on a dashboard, push notification, etc.).

However, the sender can be otherwise notified regarding an asset event.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method for tracking an asset, comprising:
receiving a digital version of the asset associated with a sender;
determining an asset identifier for the asset;
generating an asset barcode based on the asset identifier;
transmitting the digital version to a printer, wherein the printer prints the asset and the asset barcode;
determining a picked-up event for the asset, wherein the picked-up event represents asset pick-up from the printer by a delivery service, wherein the picked-up event is determined based on an invoice received from the delivery service, wherein the invoice comprises a first batch identifier and a pick-up timestamp, wherein the asset is associated with a second batch identifier, and wherein determining the picked-up event comprises associating the asset with the pick-up timestamp when the first batch identifier and the second batch identifier match; and
notifying the sender of the picked-up event.

2. The method of claim 1, further comprising determining an asset event based on a scan of the asset barcode at a delivery service facility.

3. The method of claim 2, further comprising, notifying the sender of the asset event based on notification preferences specified by the sender.

4. The method of claim 2, wherein the asset event is a processed-for-delivery event.

5. The method of claim 4, wherein a received-by-recipient event can be inferred based on a predetermined period after the processed-for-delivery event.

6. The method of claim 4, further comprising, calculating a delivery speed for the asset based on the picked-up event and the processed-for-delivery event.

7. The method of claim 2, wherein the asset event is a return-to-sender event.

8. The method of claim 1, wherein the sender is notified of the picked-up event using a push notification.

9. The method of claim 1, wherein the asset is part of an order, wherein assets of the order are routed to multiple different printers, wherein the assets of the order are associated with different picked-up events.

10. The method of claim 1, wherein notifying the sender comprises sending the picked-up event to the sender.

11. The method of claim 1, wherein the sender is notified of the picked-up event after the sender subscribes to a webhook associated with the picked-up event.

12. The method of claim 1, wherein the picked-up event is determined after a first scan of the barcode at a delivery service facility.

13. The method of claim 1, wherein the printer and the delivery service are third-party services.

14. The method of claim 1, wherein the digital version of the asset is programmatically generated.

15. A system for tracking an asset, comprising a processing system configured to:
receive a digital version of the asset associated with a sender;
determine an asset identifier for the asset;
generate an asset barcode based on the asset identifier;
transmit the digital version to a printer, wherein the printer prints the asset and the asset barcode;
determine a picked-up event for the asset, wherein the picked-up event represents asset pick-up from the printer by a delivery service, wherein the picked-up event is determined based on an invoice received from the delivery service, wherein the invoice comprises a first batch identifier and a pick-up timestamp, and wherein the asset is associated with a second batch identifier, wherein determining the picked-up event comprises associating the asset with the pick-up timestamp when the first batch identifier and the second batch identifier match; and
notify the sender of the picked-up event.

16. The system of claim 15, wherein the system asynchronously communicates an asset event associated with the asset to the sender.

17. The system of claim 16, wherein the sender subscribes to a webhook associated with the asset, and wherein the processor further configured to search a database for information associated with the webhook, using elastic search.

18. The system of claim 15, wherein the asset barcode is an IMB barcode.

19. The system of claim 15, wherein the processor is further configured to determine an asset event based on a scan of the asset barcode at a delivery service facility; and notify the sender of the asset event based on notification preferences specified by the sender.

20. The system of claim 15, wherein the processor is further configured to determine a processed-for-delivery event based on a scan of the asset barcode at a delivery service facility; and infer a received-by-recipient event after a predetermined period from the processed-for-delivery event.

* * * * *